A. M. LAYCOCK.
ROLLER BEARING.
APPLICATION FILED APR. 18, 1916.

1,247,288.

Patented Nov. 20, 1917.
2 SHEETS—SHEET 1.

Witnesses
G. F. Baker.
H. P. Jennings.

Inventor
Arthur M. Laycock
by Foster Freeman Watson & Coit
Attorneys

A. M. LAYCOCK.
ROLLER BEARING.
APPLICATION FILED APR. 18, 1916.

1,247,288.

Patented Nov. 20, 1917.
2 SHEETS—SHEET 2.

Witnesses
G. F. Baker.
H. P. Jennings.

Inventor
Arthur M. Laycock
by Foster Freeman Watson & Coit
Attorneys

UNITED STATES PATENT OFFICE.

ARTHUR M. LAYCOCK, OF KINGSTON, PENNSYLVANIA.

ROLLER-BEARING.

1,247,288.

Specification of Letters Patent.　　Patented Nov. 20, 1917.

Application filed April 18, 1916.　Serial No. 91,989.

*To all whom it may concern:*

Be it known that I, ARTHUR M. LAYCOCK, a subject of the King of Great Britain, and residing at Kingston, county of Luzerne, State of Pennsylvania, have invented certain new and useful Improvements in Roller-Bearings, of which the following is a specification.

The invention relates to roller bearings. Its principal objects are to provide a simple means whereby the bearing may be assembled and the rollers held in position against axial displacement. Other objects will appear from the following description.

The bearing may comprise an inner ring and an outer ring with interposed rollers. These rollers are prevented from axial displacement by suitable means which includes a removable split ring carried by one of the rings.

The various features of the invention will be understood from an inspection of the accompanying drawing, in which, Figure 1 is an end elevation with part of the flange on the outer ring broken away to disclose the split ring;

Figure 2:
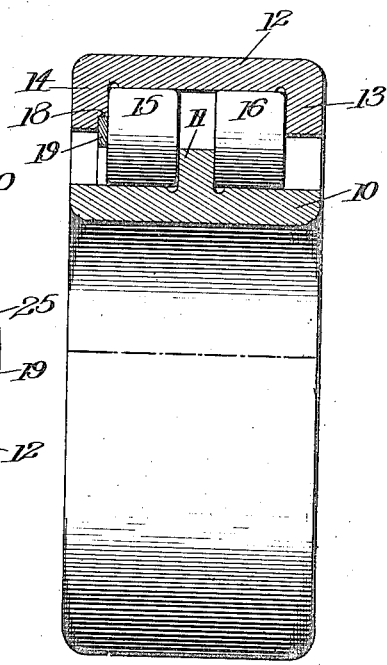
Fig. 2 is a half side elevation and half sectional view.

The bearing comprises an inner ring 10 and an outer ring 12. As shown in Fig. 2 the bearing may be of the two-row type and the inner ring may be provided with a medially located outwardly extending radial flange 11 and the outer ring may be provided with an inwardly extending radial flange 13, 14, at each end. Interposed between the two rings and the flanges 11, 13, 14 are two rows of roller bearings. As shown, these rollers are of such dimensions that the diameter of each is greater than the length. However, this feature is not part of the invention, as the bearing may consist of rollers of any dimensions.

Figure 1:
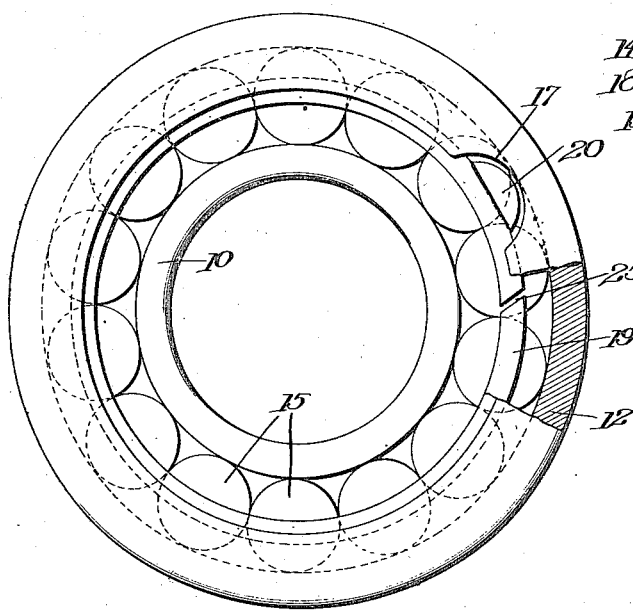

One of the flanges as 14 is provided with an opening 17. This opening is for the purpose of passing the rollers into or out of the bearing and may be of any shape that will accomplish this result. In Fig. 1 this opening is shown as arcuate, being substantially semi-circular in outline. The flange 14 which has the opening is also formed with a slot or groove 18 at its inner periphery. This slot or groove is adapted to form a seat for a resilient or yielding split expansible ring 19. The ring is made so that its diameter when contracted is slightly less than the diameter of the inner periphery of the flange 14. Thus the ring may be contracted and inserted within the flange 14 until it reaches the groove when it will expand and seat and automatically lock itself in the groove 18.

The ring may be provided with a projection or tab 20 slightly smaller than the opening 17 in the flange, and adapted to substantially close the said opening when the ring is in the groove. The projection 20 is thicker than the ring so that it may have considerable bearing area against the side of the opening 17, thereby steadying the ring and preventing circumferential displacement.

The parts of the bearing are assembled by mounting rings 10 and 13 with the interposed row of rollers 16 in the usual way. The row of rollers 15 is placed in position by inserting successive rollers through the opening 17 and moving them around in the raceway. When all the rollers 15 have been inserted, the split ring 19 is contracted and inserted within the flange 14, with the projection 20 in register with the opening 17, and is pushed inward until it expands and seats itself in the slot or groove 18. The ring thus forms a means for blocking the opening 17.

Figure 3:
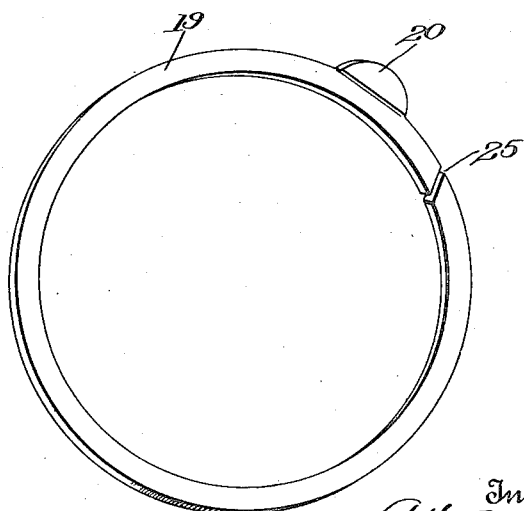
Fig. 3 is a perspective view of the split ring.
Figure 4:
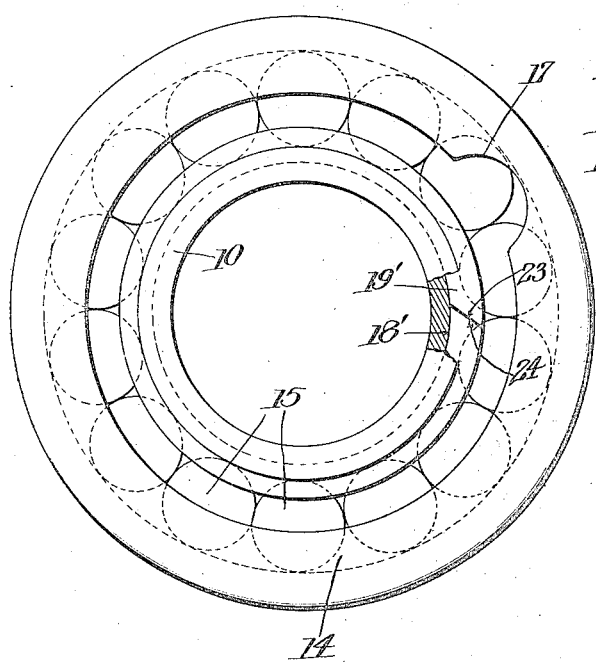
Fig. 4 is a view similar to Fig. 1 showing another form of the invention.
Figure 5:
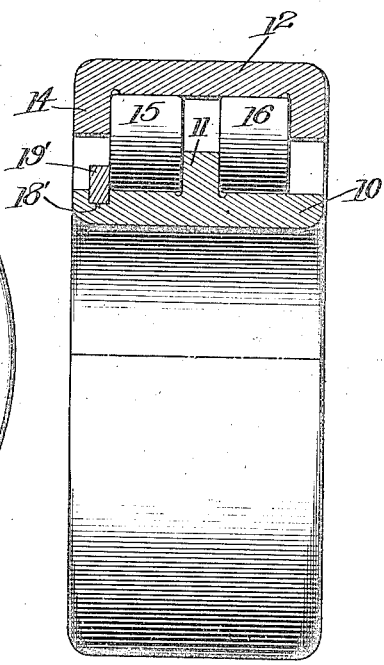
Fig. 5 is a half side elevation and half sectional view of the second form of the invention.
Figure 6:
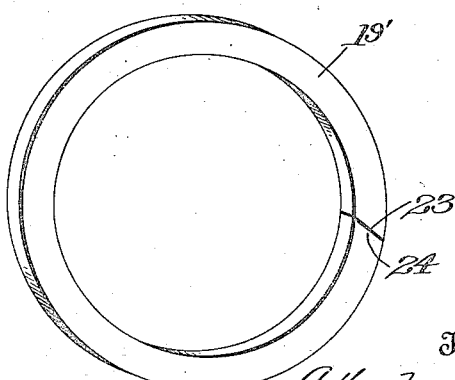
Fig. 6 is a perspective view of a split ring used in the second form of the invention.

Figs. 4, 5 and 6 show another form of the invention. In this embodiment, a contractible instead of an expansible split ring is used, and it is mounted in the inner ring instead of the outer. In the outer surface of the inner ring and adjacent one of its edges, a slot or groove 18' is formed, which is adapted to seat a split contractible ring 19', so that the latter will project above the periphery of the inner ring, and afford an abutment in the plane of the flange 14, for the rollers 15. When the ring seats itself in the groove 18' its ends 23, 24 abut each other, thereby forming a continuous ring and presenting a continuous surface to the ends of rollers 15. In the other form, however, as the ring 19 must expand to seat itself, there is a slight gap, as shown at 25 in Fig. 3. The bearing is assembled in the same manner as the form illustrated in Figs. 1, 2 and 3, except that the contractible instead of expansible ring is used.

While the invention is shown in connection with a roller bearing having two rows of rollers, it is obvious that it is adapted to other forms and is not limited to a two row bearing.

Having described my invention what I claim an new and desire to secure by Letters-Patent is, 1. In a roller bearing, an inner ring, an outer ring, interposed cylindrical rollers having flat ends, means for preventing axial displacement of said rollers including a flange carried by one of said rings having a flat surface in contact with one end of the rollers and an opening for inserting the rollers; and a split ring carried by one of the rings having a flat surface flush with the said flat surface on the flange.

2. In a roller bearing, an inner ring, an outer ring, interposed cylindrical rollers having flat ends, means for preventing axial displacement of said rollers including a flange carried by one of said rings having a flat surface in contact with one end of the rollers and formed with a groove and an opening for inserting the rollers; and a split ring seated in said groove with its inner surface flush with the said flat surface on the flange.

3. In a roller bearing, a ring having a flange formed with an opening for inserting the rollers and a groove; and a split ring seated in said groove and having an enlargement extending into and substantially closing said opening.

4. In a roller bearing, a ring having a flange formed with an opening for inserting the rollers and a groove; and a split ring seated in said groove and having an enlargement thicker than said split ring extending into and substantially closing said opening.

In testimony whereof I affix my signature.

ARTHUR M. LAYCOCK.